US008364172B2

(12) United States Patent
Guanfeng et al.

(10) Patent No.: US 8,364,172 B2
(45) Date of Patent: *Jan. 29, 2013

(54) PEER-TO-PEER LOCATION SERVICE (75) Inventors: Li Guanfeng, Fremont, CA (US); Hongji Bao, Beijing (CN); Edward Chang, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/969,291

(22) Filed: Dec. 15, 2010

(65) Prior Publication Data

US 2012/0157121 A1 Jun. 21, 2012

(51) Int. Cl.
*H04W 72/00* (2009.01)
(52) U.S. Cl. ............... 455/456.2; 455/456.1; 455/422.1; 370/328; 370/338
(58) Field of Classification Search ............... 455/456.1, 455/456.2, 456.6, 458, 404.2, 41.2, 433; 370/328–338
See application file for complete search history.

(56) References Cited

U.S. PATENT DOCUMENTS

| | | | |
|---|---|---|---|
| 2004/0063451 A1* | 4/2004 | Bonta et al. ................... 455/519 |
| 2004/0064693 A1 | 4/2004 | Pabla et al. |
| 2004/0162027 A1* | 8/2004 | Chang .......................... 455/41.2 |
| 2004/0162830 A1 | 8/2004 | Shirwadkar et al. |
| 2005/0240591 A1 | 10/2005 | Marceau et al. |
| 2005/0289648 A1 | 12/2005 | Grobman et al. |
| 2006/0079244 A1 | 4/2006 | Posner et al. |
| 2007/0202887 A1* | 8/2007 | Counts et al. ............... 455/456.1 |
| 2008/0200181 A1* | 8/2008 | Zill et al. .................. 455/456.1 |
| 2010/0061294 A1 | 3/2010 | Proctor et al. |
| 2010/0254308 A1* | 10/2010 | Laroia et al. ................. 370/328 |

OTHER PUBLICATIONS

Specification vol. 2, Specification of the Bluetooth System, Experience More, Core System Package [BD/EDR Controller volume], Covered Core Package version: 4.0. Bluetooth, Last updated Jun. 30, 2010. Title page, p.2, and pp. 182-190.
Thilliez et al., "Evaluating Location Dependent Queries Using ISLANDS," First Published in Jan. 2004. Available online at <http://www.univ-valenciennes.fr/ROI/SID/ThierryDelot_fichiers/BDADemo.pdf>, (5 pgs.).
Vossiek et al., "Wireless Local Positioning," IEEE Microwave Magazine, vol. 4 No. 4, Dec. 2003. pp. 77-86.
International Search Report and Written Opinion of international application No. PCT/US2011/064788, dated Apr. 4, 2012, 13 pp.
Notice of Allowance from U.S. Appl. No. 13/250,709, dated Jul. 31, 2012, 19 pp.
Office Action from U.S. Appl. No. 13/250,709, dated Nov. 25, 2011, 14 pp. Response to Office Action dated Nov. 25, 2011, from U.S. Appl. No. 13/250,709, filed Feb. 27, 2012, 16 pp.

\* cited by examiner

*Primary Examiner* — Chuong A Ngo
(74) *Attorney, Agent, or Firm* — Shumaker & Sieffert, P.A.

(57) ABSTRACT

Techniques are described for obtaining high-resolution physical locations for a wireless device by leveraging the high-resolution physical location capabilities of wireless peers of the wireless device to provide a peer-to-peer location service and facilitate location targeting. Wireless devices provide location updates to a computing cloud, which stores records associating wireless device identifiers with received location information for the corresponding wireless devices. A wireless device issues a peer discovery request to dynamically identify nearby wireless peers in its network. The wireless device then sends wireless device identifiers for the nearby wireless peers in a location request to the computing cloud, which estimates a location for the wireless device using the previously recorded location information for the nearby wireless peers. The computing cloud returns the estimated location to the requesting wireless device.

18 Claims, 6 Drawing Sheets

PEER-TO-PEER LOCATION SERVICE

TECHNICAL FIELD

The disclosure relates to computer networks and, more specifically, to determining a physical location of a computing device.

BACKGROUND

A computer network is a collection of interconnected computing devices that can exchange data and share resources. In a packet-based network, such as an Ethernet network, the computing devices communicate data by dividing the data into small blocks called packets, which are individually routed across the network from a source device to a destination device. A variety of intermediate devices operate to route the packets between the computing devices. For example, a computer network may include routers, switches, gateways, firewalls, and a variety of other devices to provide and facilitate network communication.

A wireless communication network includes a collection of cells that each includes at least one base station capable of transmitting and relaying signals to wireless communication devices. A "cell" generally denotes a distinct area of a wireless network that utilizes a particular frequency or range of frequencies for transmission of data. A typical base station is a tower to which are affixed a number of antennas that transmit and receive the data over the particular frequency. Wireless devices, such as cellular or mobile phones, smart phones, camera phones, personal digital assistants (PDAs), laptop computers, and tablet computers, may initiate or otherwise transmit a signal at the designated frequency to the base station to initiate a call or data session and begin transmitting data. The base station covers a limited geographic area (a "cell") but may exchange data with wireless devices irrespective of whether the wireless devices within the cell of the base station are moving or stationary.

Many wireless computing devices that access a wireless network include a Global Positioning System (GPS) receiver that enables the computing devices to accurately determine their physical location. Accurate locations for wireless devices have led to the development of location-targeted network and application services, for example, for wireless devices that can provide such a location.

SUMMARY

In general, techniques are described for obtaining high-resolution physical locations for a wireless device by leveraging the high-resolution physical location capabilities of wireless peers of the wireless device to provide a peer-to-peer location service and facilitate location determination and/or targeting. In one example, the techniques include executing update daemons on wireless devices that operate according to policies to provide physical location information to the location service. The location service receives physical location information, together with other descriptive information for the wireless devices, from the update daemons of the wireless devices and stores this information to a location service back-end, such as a database.

To use the peer-to-peer location service, a wireless device first issues a peer discovery request to dynamically identify nearby wireless peers in its network. Each nearby wireless peer responds to the requesting wireless device with an identifier. The wireless device collects the wireless peer identifiers and issues the wireless peer identifiers in a location query to the location service. Upon receiving the location query containing the wireless peer identifier, the location service accesses the back-end to obtain previously stored physical location and other descriptive information for the identified wireless peers. The location service then applies a location model to the physical location and other descriptive information for the identified wireless peers to estimate a physical location for the wireless device. The location service then replies to the location query with an estimated physical location for the wireless device.

The described techniques may provide one or more advantages. For example, a peer-to-peer location service may provide a high-resolution location to wireless devices that do not have a location determination capability, that have only a low-resolution location determination capability, or that currently are unable to use their native location determination capability due to interference. For example, the peer-to-peer location service may incorporate additional information not possessed by the wireless devices. Moreover, many wireless devices, such as mobile phones, have limited power and/or processing capacity and may achieve power and/or processing consumption reductions by outsourcing location determination to a peer-to-peer location service. As a still further example, other peer-utilizing location techniques, such as directly querying neighboring peers for their location to obtain peer locations with which to determine a location, increase traffic within the wireless network and therefore reduce available bandwidth. Using a location service may reduce a number of peer-to-peer messages within the wireless network and thereby reduce congestion.

In one embodiment, the disclosure is directed to a method comprising receiving, with a wireless communication device communicatively coupled to a wireless communication network, one or more peer identities for corresponding one or more peer devices communicatively coupled to the wireless communication network. The method further comprises sending a location query that includes the one or more peer identities from the wireless communication device to a server of a location service, wherein the location query comprises a request for a physical location of the wireless communication device that is estimated by the location service based at least on the physical locations of the one or more peer devices. The method additionally comprises receiving, in a location response from the location service, the estimated physical location of the wireless communication device.

In one embodiment, the disclosure is directed to a method comprising receiving, with a server of a location service, location update messages from corresponding wireless communication devices, wherein the location update messages include physical locations and peer identities for the corresponding wireless communication devices. The method further comprises storing, with the server, the physical locations and the peer identities to a storage device that provides data storage and retrieval for the location service, and querying, with the server, the storage device using the peer identities to obtain physical locations of the wireless communication devices corresponding to the peer identities. The method additionally comprises determining, with the server, an estimated physical location of a first wireless communication device that is a peer of the wireless communication devices based at least on the physical locations, and outputting the estimated physical location from the server to the first wireless communication device in a location response.

In another embodiment, the disclosure is directed to a wireless communication device coupled to a wireless communication network, the wireless communication device comprising means for receiving one or more peer identities for corresponding peer devices communicatively coupled to the wireless communication network. The wireless communication device also comprises a location module that sends a location query that includes the peer identities to a location service, wherein the location query comprises a request for a physical location of the wireless communication device that is estimated by the location service based at least on the physical locations of the one or more peer devices, and wherein the location module receives, in a location response from the location service, the estimated physical location of the wireless communication device.

In another embodiment, the disclosure is directed to a system comprising an update server that receives location update messages from corresponding wireless communication devices, wherein the location update messages include physical locations and peer identities for the corresponding wireless communication devices. The system also comprises a location data store comprising a computer readable storage medium that stores the physical locations and identifiers for the corresponding wireless communication devices to a storage device that provides data storage and retrieval. The system further comprises a database interface of a query server that queries the location data store using the peer identities to obtain the physical locations. The system additionally comprises means for determining an estimated physical location of a first wireless communication device that is a peer of the wireless communication devices based at least on the physical locations. The system further comprises a query interface of the query server that outputs the estimated physical location to the first wireless communication device in a location response.

In another embodiment, the disclosure is directed to a non-transitory computer-readable medium containing instructions. The instructions cause a programmable processor to receive, with a wireless communication device communicatively coupled to a wireless communication network, one or more peer identities for corresponding one or more peer devices communicatively coupled to the wireless communication network. The instructions also cause the programmable processor to send a location query that includes the one or more peer identities from the wireless communication device to a location service, wherein the location query comprises a request for a physical location of the wireless communication device that is estimated by the location service based at least on the physical locations of the one or more peer devices. The instructions also cause the programmable processor to receive, in a location response from the location service, the estimated physical location of the wireless communication device.

In another embodiment, the disclosure is directed to a non-transitory computer-readable medium containing instructions. The instructions cause a programmable processor to receive, with a server of a location service, location update messages from corresponding wireless communication devices, wherein the location update messages include physical locations and peer identities for the corresponding wireless communication devices. The instructions further cause the programmable processor to store, with the server, the physical locations and the peer identities to a storage device that provides data storage and retrieval for the location service. The instructions further cause the programmable processor to query, with the server, the storage device using the peer identities to obtain physical locations of the wireless communication devices corresponding to the peer identities. The instructions further cause the programmable processor to determine, with the server, an estimated physical location of a first wireless communication device that is a peer of the wireless communication devices based at least on the physical locations. The instructions further cause the programmable processor to output the estimated physical location from the server to the first wireless communication device in a location response.

The details of one or more embodiments of the disclosure are set forth in the accompanying drawings and the description below. Other features, objects, and advantages of the disclosure will be apparent from the description and drawings, and from the claims.

DETAILED DESCRIPTION

Figure 1:
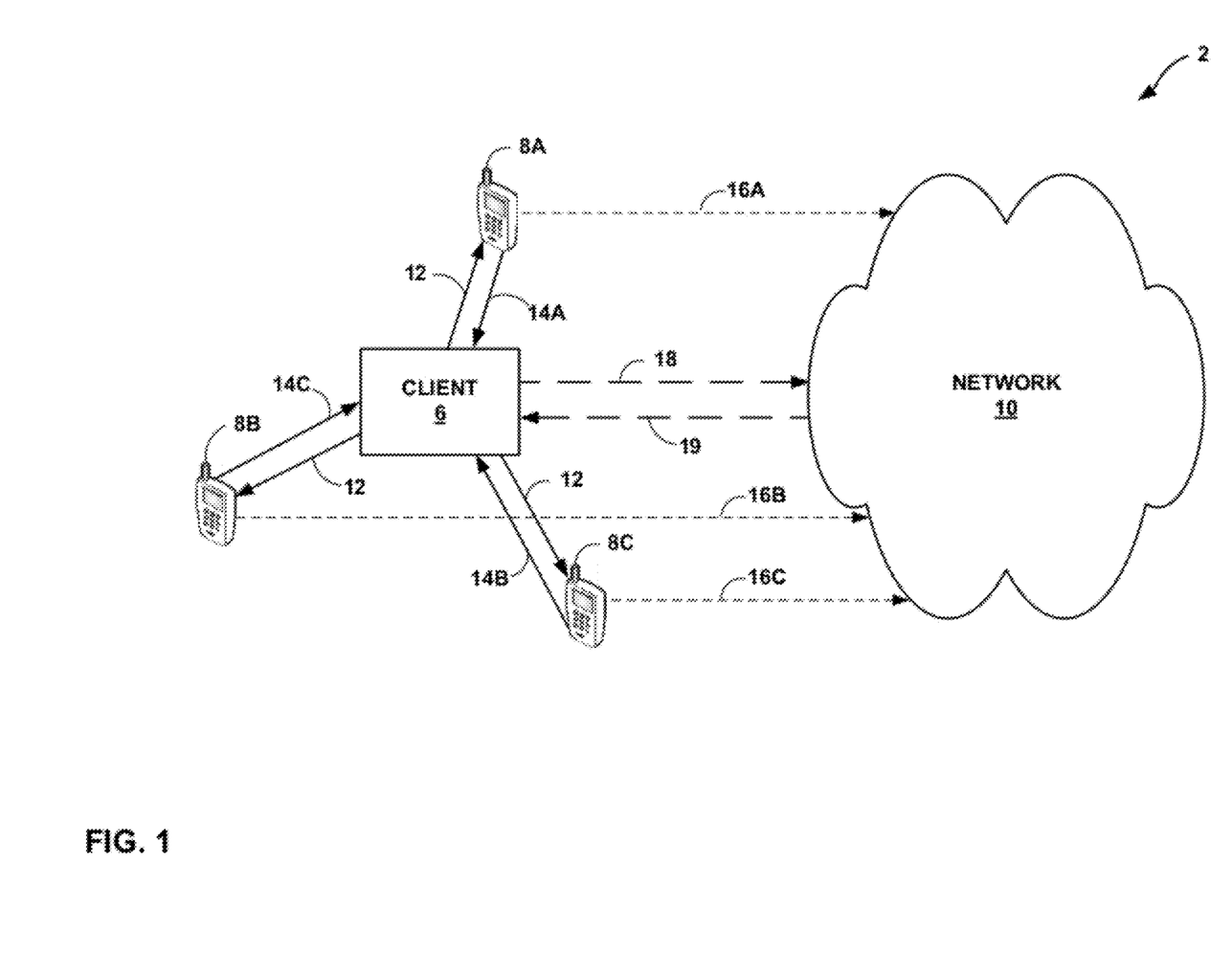
FIG. 1 is a block diagram illustrating an example network system that provides a peer-to-peer location service in accordance with one or more of the techniques described herein.

FIG. 1 is a block diagram illustrating an example network system 2 that provides a peer-to-peer location service in accordance with one or more of the techniques described herein. Network system 2 includes network 10 that receives location information from wireless communication devices 8A-8C ("wireless devices 8") and provides an estimated location to client 6.

Network 10 provides network access, data transport and other services, including the peer-to-peer location service, to wireless devices 8. In general, network 10 may include and implement any commonly defined cellular network architecture including those defined by standards bodies, such as a Global System for Mobile communication (GSM) Association, a 3$^{rd}$ Generation Partnership Project (3GPP), a 3$^{rd}$ Generation Partnership Project 2 (3GGP/2), an Internet Engineering Task Force (IETF) and a Worldwide Interoperability for Microwave Access (WiMAX) forum. For example, network 10 may implement one or more of a GSM architecture, a General Packet Radio Service (GPRS) architecture, a Universal Mobile Telecommunications System (UMTS) architecture, and an evolution of UMTS referred to as Long Term Evolution (LTE), each of which are standardized by 3GGP. Network 10 may, alternatively or in conjunction with one of the above, implement a code division multiple access-2000 ("CDMA2000") architecture. Network 10 may, again as an alternative or in conjunction with one or more of the above, implement a WiMAX architecture defined by the WiMAX forum. Network 10 may also comprise, for instance, a local area network (LAN), a wide area network (WAN), the Internet, a virtual LAN (VLAN), an enterprise LAN, a layer 3 virtual private network (VPN), an enterprise IP network, or any combination thereof.

In some embodiments, network system 2 implements the peer-to-peer location service as a cloud-computing service. In such embodiments, network 10 comprises a computing cloud back end that cooperates with the computing cloud front end operating on wireless devices 8 and client 6 to provide the peer-to-peer location service. In such embodiments, the network 10 cloud back end comprises, for example, one or more application servers, controllers, and data storage centers interconnected via communication links. The term "communication link," as used herein, comprises any form of transport medium, wired or wireless, and can include intermediate nodes such as network devices. The computing cloud front end includes wireless devices 8 and client 6 and applications running thereon to exchange data, in accordance with cloud middleware protocols, with the computing cloud back end of network 10.

Client 6 and each of wireless devices 8 is a wireless communication device that may comprise, for example, a mobile telephone, a laptop, tablet, or desktop computer having, e.g., a 3G wireless card, a wireless-capable netbook, a video game device, a pager, a smart phone, an ultra-mobile personal computer (UMPC), or a personal data assistant (PDA). Client 6 and each of wireless devices 8 may run one or more applications, such as Internet browsers, voice calls, video games, videoconferencing, and email, among others.

Wireless devices 8 determine their respective locations to generate location information. Location information identifies physical locations of the wireless devices within two- or three-dimensional space. In the illustrated example, wireless devices 8 include global positioning system (GPS) receivers that receive signals from the GPS that respective wireless devices 8 use to generate latitude and longitude coordinates (or "GPS coordinates") that identify a geographical location of wireless device, that is, a position of the wireless device on the surface of the Earth. In some embodiments, one or more of wireless devices 8 use alternative techniques to determine their respective locations and generate location information. For example, wireless devices 8 may provide a user interface that allows a user to enter a location as, for example, a city and state, a street address, or a building floor. As another example, wireless devices 8 may use an identifier for the base station with which the host exchanges wireless signals as a physical location value. Various base stations of a cellular network cover different locations and thus a base station identifier correlates to a physical location for mobile devices served by the base station identifier. As still further examples, wireless devices 8 may determine a Wi-Fi connection location identifier, GSM localization information, time difference of arrival (TDOA) information, or altitude data and include such information within location information.

Each of wireless devices 8 issues respective location updates 16A-16C ("location update 16") to network 10. Each of location updates 16 includes location information describing the current location of the issuing one of wireless devices 8. Location updates 16 may conform to a peer-to-peer location service protocol that identifies the message as comprising location information for the issuing one of wireless devices 18. Location updates 16 may also in some instances include a covering radius value that describes the precision of the location information with the respective location update message. For example, location information obtained using a GPS receiver may have a high degree of precision and a correspondingly low radius value. Location updates 16 additionally include a peer identifier for the issuing one of wireless devices 18. As described in further detail below with respect to FIG. 2, peer identifiers may be specific to the peer-to-peer location service or may be derived from a wireless device identity. In some embodiments, location updates 16 may additionally include location acquisition method identifiers that identify the method used by the wireless devices 8 to obtain the location information contained within the location updates. For example, a location acquisition method identifier may refer to GPS.

Network 10 receives location updates 16 and stores the peer identities and location information using an associative data structure that associates peer identities with the corresponding location information. For example, network 10 may store a peer identity for and location information for wireless device 8A to a database table that associates the peer identity and the location information. In this way, network 10 stores updated location information for each of wireless devices 8. In some embodiments, network 10 additional stores location acquisition method identifiers received in location updates 16 with associated peer identities and location information.

Client 6 is a wireless device that uses the peer-to-peer location service provided by network 10 to determine its location. Client 6 broadcasts, within the wireless band, peer discovery request 12 to determine wireless peers of client 6. The term "wireless peers," as used herein, denotes two or more wireless devices that communicate using the same wireless network, such as a wireless LAN (WLAN) as defined by IEEE 802.11, a Bluetooth network, or a particular base station of a cellular network that defines a cell in which the wireless peers operate. An IEEE 802.11 based (Wi-Fi) network may operate in ad-hoc (peer-to-peer) or infrastructure mode. In some embodiments, client 6 may broadcast peer discovery request 12 for receipt by wireless devices. In some embodiments, client 6 may send peer discovery requests 12 to a wireless access point (WAP), such as a cellular base station or IEEE 802.11 WAP, to request peer IDs for wireless devices attached to the WAP. In such instances, wireless devices 8 may register their respective peer identities with the WAP as an aspect of WAP attachment.

Peer discovery requests 12 received by wireless devices 8 prompts the wireless devices to respond with respective peer responses 14A-14C ("peer responses 14") that each includes a peer identity for the issuing device. Receiving peer responses 14 with client 6 indicates wireless devices 8 are wireless peers and are thus in proximity to client 6. Peer discovery requests 12 and peer responses 14 may conform to the peer-to-peer location service protocol described above with respect to location updates 16.

Client 6 collects peer identities, received in peer responses 14, for wireless devices 8 and issues location query 18 to network 10. Location query 18 includes a list of the collected peer identities. Network 10, upon receiving location query 18, obtains the corresponding location information for the list of collected peer identities from the associative data structure previously populated by network 10 using information collected from location updates 16. Network 10 then uses the location information for the wireless peers of client 6, that is, for wireless devices 8, to determine an estimated physical location for client 6 and returns the estimated location to client 6 in location response 19. The physical location may specify GPS coordinates or other location information, for example. Network 10 may, in some instances, additionally include in location response 19 a covering radius and a confidence value that describes a degree of confidence that network 10 calculates based on location information for wireless peers of client 6. Location query 18 and location response 19 may conform to the peer-to-peer location service protocol described above with respect to location updates 16. In embodiments where network 10 receives and stores location acquisition method identifiers, network 10 may additionally use the location acquisition method identifiers to affect estimation of the physical location or other location information (such as a confidence level) for client 6.

Many wireless devices do not have a high-resolution location capability, such as a GPS receiver, to inform device applications of the location of the device. Even wireless devices that do have such a capability may find that capability frustrated due, for example, to interference at a particular location. Other conventional methods for determining a wireless device rely on heuristics derived from a network topology or known physical locations of network devices that implement an access network to which the wireless device is attached. These methods tend to provide relatively low-resolution location data that may be inadequate for effective location targeting.

Using the peer-to-peer location service in the manner described above enables client 6 to determine its physical location even where client 6 is unable to receive GPS signals or access another type of location service. Thus, even if client 6 is in an "urban canyon" or indoors, client 6 may receive from network 10, in accordance with the peer-to-peer location service, an estimated location that has a degree of resolution that leverages the location resolution of its wireless peers. In addition, outsourcing calculation of the client 6 physical location to network 10 leverages the much-higher processing capabilities of network 10 and reduces power consumption on client 6.

Figure 2:
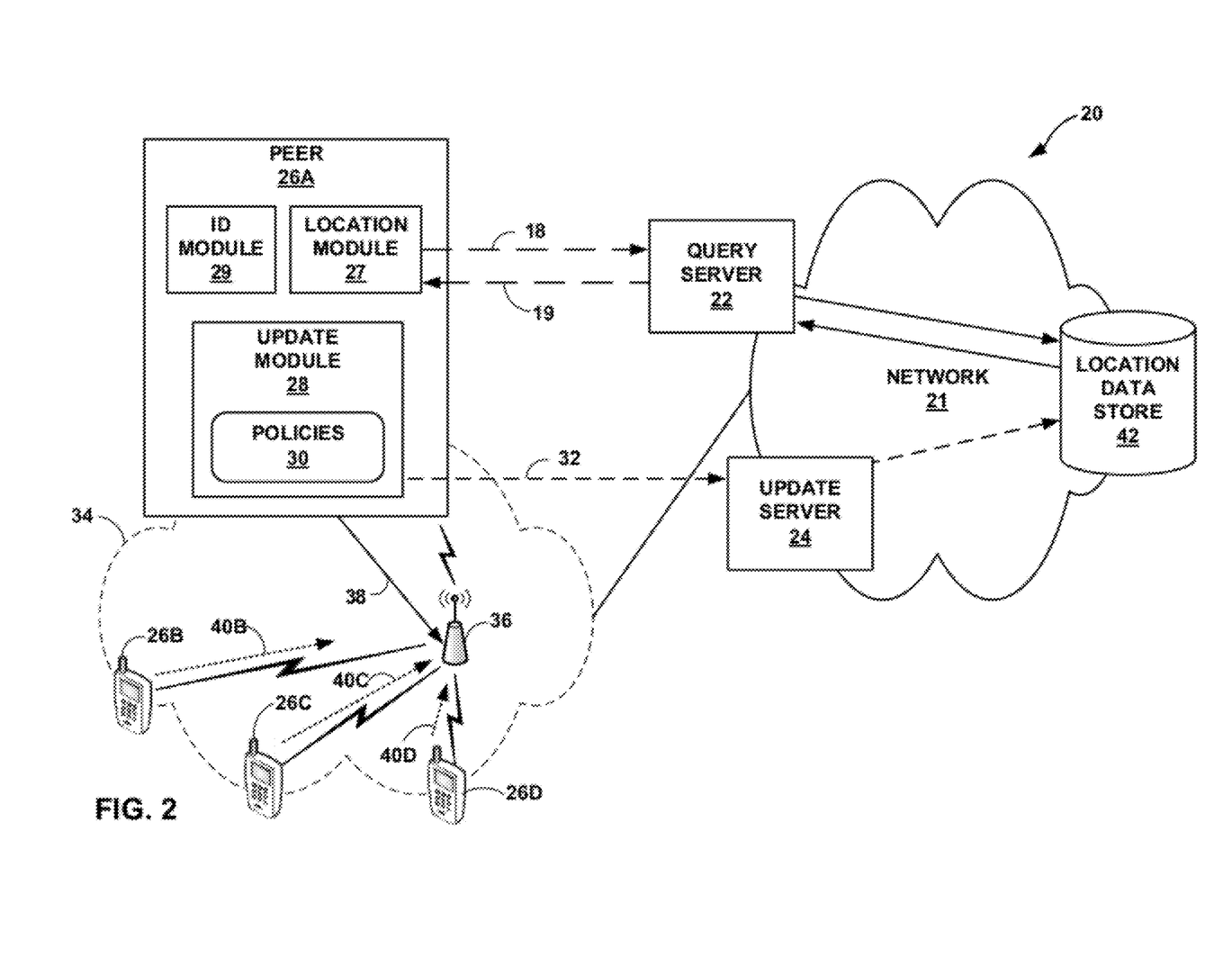
FIG. 2 is a block diagram illustrating an example network system that implements a peer-to-peer location service in accordance with one or more of the described techniques.

FIG. 2 is a block diagram illustrating an example network system 20 that implements a peer-to-peer location service in accordance with the described techniques. Network system 20 may represent an example embodiment of network system 2 of FIG. 1. In some instances, network system 20 and wireless network 34 in combination represent an embodiment of network 10 of FIG. 1.

Wireless network 34 of network system 20 comprises a Wi-Fi network operating in infrastructure mode in which wireless peers 26A-26D ("peers 26") communicate via wireless access point 36 ("WAP 36") to which peer 26 are communicatively coupled. While each of peers 26 may include substantially similar structural modules, for ease of illustration, only peer 26A is illustrated in FIG. 2 and described in detail herein. WAP 36 records network addresses of wireless peers 26 attached to wireless network 34. In some embodiments, peers 26 form an ad-hoc Wi-Fi, Bluetooth network, or other type of ad-hoc network, are thus communicatively coupled, and communicate directly, rather than via WAP 36.

Location module 27 of peer 26A determines peers 26B-26D within wireless network 34 by issuing peer discovery request 38. In the illustrated embodiment, peer discovery request 38 is a broadcast packet that includes an application-layer payload that conforms to the peer-to-peer location service protocol described above with respect to FIG. 1. That is, peer discovery request 38 includes an application-layer message header that describes the message as a peer discovery request. The message body may be empty or, alternatively, may include a peer identity for peer 26A. Update module 28 issues peer discovery request 38 by sending the peer discovery request to WAP 36 via wireless network 34 protocol interfaces. WAP 36 then broadcasts peer discovery request 38 to peers 26B-26D.

Each of peers 26B-26D receives peer discovery request 38 and responds to peer 26, via WAP 36, with a respective one of peer responses 40B-40D ("peer responses 40"). Each of peer responses 40 includes a peer identity for the responding one of peers 26. Peer responses 40 may conform to an application-layer protocol that includes an application-layer message header that describes the message as a peer response. Peer responses 40 may, like peer discovery request 38, be broadcast to all peers 26 via WAP 36 and be disambiguated according to the embedded peer identity for the responding one of peers 26. Peer responses 40 may alternatively be addressed to peer 26A by the responding peer. For example, peer 26C may determine a network-layer source address (e.g., IP address) for peer 26A from peer discovery request 38. Peer 26C then sets a network-layer destination address within peer response 40 to the determined network-layer source address in order to respond directly to peer 26A with the peer identity for peer 26C. Peers 26B-26D may represents peer devices arranged in a multiple hop configuration and therefore may be logically located multiple network hops from peer 26A.

Peer responses 40 may include additional information for characterizing a distance to peer 26A. For example, one or more of peer responses 40 may include a signal strength value for the issuing device that correlates to distance to WAP 36 or to a peer within an ad-hoc Wi-Fi network. Peers 26B-26D may only respond with corresponding peer responses 40 when the peers have knowledge of their current physical location and participate in the peer-to-peer location service to provide location updates.

In some embodiments, WAP 36 also receives and responds to a peer discovery request 38 with a peer identity for the WAP. In such embodiments, WAP 36 may include an update module that provides a location for the WAP to update server 24. Alternatively, because WAP 36 is typically stationary, an administrator may set an association within location data store 42 between a peer identity for WAP 36 and a location for the WAP.

In some embodiments, WAP 36 collects peer identities for peers 26 during an attachment process. That is, WAP 36 receives the peer identities for each of peers 26 when the respective peers request wireless services. In such embodiments, WAP 36 receives peer discovery request 38 from peer 26A and responds with the collected list of peer identities of attached ones of peers 26. In some embodiments, peers 26 form an ad-hoc Wi-Fi or other type of ad-hoc network and communicate directly, rather than via WAP 36. In such instances, peer 26A may issue individual peer discovery requests 38 directly to each of peers 26B-26D or may broadcast peer discovery request 38 to all of peers 26B-26D. In instances where wireless network 34 comprises a Bluetooth network, peer discovery request 38 may comprise one or more INQUIRY messages or PAGE messages. Bluetooth INQUIRY and PAGE messages are described in Bluetooth Special Interest Group, "Bluetooth Specification," Version 4.0, June 2010, of which Volume 1, section 4.2 is incorporated herein by reference.

In some embodiments, peer 26A implements Wi-Fi monitor or promiscuous mode or implements Bluetooth, any of which allows peer 26A to monitor wireless network traffic traversing the corresponding network. Peer 26A may determine peers 26B-26D by identifying the network address, MAC address, or other identifiers for the peers from monitored wireless network traffic.

Peer 26A additionally comprises identity module 29 (illustrated as "ID module 29") to respond to peer discovery requests, received from any of peers 26B-26D, with a peer identity for peer 26A. Identity module 29 maintains a peer identity that uniquely identifies the peer to network 21. A peer identity may comprise, for instance, an IP or other Packet Data Protocol (PDP) address, a globally unique IP address, an International Mobile Subscriber Identity (IMSI), or an International Mobile Equipment Identity (IMEI). In some instances, a peer identity may comprise a privacy-preserved peer identity (PPID), such as a Temporary Mobile Subscriber Identity (TMSI) or a Packet-Temporary Mobile Subscriber Identity (P-TMSI), that prevents identification of a wireless device or wireless device user based on the peer identity. In some instances, peer identities may be allocated and assigned to respective peers 26 by the peer-to-peer location service specifically to identify peers 26 for the peer-to-peer location service. Identity module 29 may comprise a subscriber identity module (SIM).

Peers 26B-26D comprise identity modules substantially similar to identity module 29. Upon receiving a peer discovery request, identity module 29 returns a peer identity to the requesting peer. For example, upon receiving peer discovery request 38, identity module 29 of peer 26B returns a peer identity maintained for peer 26B to peer 26A for use by location module 27 of peer 26A.

Update module 28 of peer 26A provides location update 32 to update server 24 of network 21. Location update 32 includes location information describing the current location of peer 26A. Because the physical location may change with any movement by peer 26A, update module 28 comprises policies 30 that determine, for example, a rate or trigger for location update messages to possibly reduce a number of such messages. That is, policies 30 define one or more policies that each specifies issuing a location update 32 upon occurrence of a condition. Policies 30 may specify, for instance, periodic updates (e.g., every 30 seconds), issuing a location update 32 upon moving a certain distance from a location described in a previous location update message, issuing a location update 32 upon receiving a peer discovery request 38 from one of peers 26B-26D, or a combination of such policies. Policies 30 may also specify issuing a location update 32 that include a predicted location based on a currently location of peer 26A and a velocity vector that describes a current direction and rate for peer 26A. Location update 32 may in some embodiments include a location acquisition method identifier.

Network system 20 also include network 21, which may represent an example embodiment of network 10 of FIG. 1. Network 21 comprises query server 22 and update server 24 to interface with wireless devices of wireless network 34 to implement a peer-to-peer location service in accordance with the techniques herein described. Update server 24 exposes an interface with which to receive location update messages, such as location update 32. For example, update server 24 may expose Simple Object Access Protocol (SOAP) methods, Remote Procedure Calls (RPCs), or a Common Object Request Broker Architecture (CORBA) interface. In some interfaces, the update server 24 interface accepts location update messages that conform to a peer-to-peer location service protocol that prescribes location updates that include an application-layer message header that describes the message as a location update. Update server 24 may comprise, for instance, an application server or AAA server, and update server 24 may constitute an aspect of a computing cloud back-end.

Update server 24 receives location update messages, such as location update 32, from peers 26 and stores the location information and associated peer identities contained therein to location data store 42, which maintains a location information-peer identity association using an associative data structure. The associative data structure may comprise, for example, a table, a linked list, or a hash table or other mapping structure. In location data store 42, a peer identity is a lookup value for the associated location information. That is, provided a peer identity, location data store 42 determines location information for the corresponding one of peers 26. Location data store 42 is a storage device that may comprise one or more databases, database servers, file servers, and/or Authentication, Authorization, and Accounting (AAA) servers, such as a Remote Authentication Dial-In User Service (RADIUS) device. In some embodiments, location data store 42 is a storage device that may comprise a non-transitory computer-readable media of query server 22 or update server 24, such as a disk drive or memory. That is, location data store 42 may be co-located with query server 22 or update server 24 within a chassis or a rack, for example.

Location module 27 of peer 26A collects peer identities received in peer responses 40 into an application-layer message and sends the message in location query 18 to query server 22, which implements an aspect of the peer-to-peer location service to provide to peer 26A in location response 19 an estimated location for peer 26A. In some instances, location query 18 may comprise a peer identity for peer 26A that issued location query 18. In some instances, location query 18 may comprise a cellular base station identifier or a WAP 36 identifier.

Query server 22 receives location query 18 and determines the set of peer identities contained therein, where the set of peer identities represent peers 26B-26D of peer 26A within wireless network 34. Query server 22 uses the set of peer identities to determine, from location data store 42, associated location information for the peers corresponding to the peer identities. In some instances, query server 22 may issue a Structured Query Language (SQL) query to location data store 42, which responds with the associated location information.

Upon determining associated location information for each of peers 26B-26D, query server 22 estimates a location for peer 26A and returns estimated location information to peer 26A in location response 19. Estimated location information may include, for example, GPS coordinates, a location radius, and a confidence level. Location module 27 of peer 26A receives estimated location information in location response 19 and provides estimated location information to any requesting application executing on peer 26A.

Query server 22 may comprise, for instance, an application server or AAA server, and query server 22 may constitute an aspect of a computing cloud back-end. In some embodiments, query server 22 and update server 24 execute on a single server. In such instances, query server 22 and update server 24 may comprise separate processes, or interfaces of a same process, executing on the single server. Despite not calculating on its own an estimated location using locations received from peers 26B-26D, peer 26A obtains a estimated location. As a result, peer 26A conserves battery and computing resources and may obtain a high-resolution estimated location by leveraging complex location determination models and high-capacity location data storage and maintenance within network 21.

In some embodiments, network system 20 implements a push technique to proactively provide an estimated location to peer 26A in lieu of peer 26A issuing peer discovery request 38 and receiving peer identities for peers 26B-26D. Peers 26B-26D may determine proximity to peer 26A using a signal strength between the respective one of peers 26B-26D and 26A. Each of peers 26B-26D may include a peer identity for peer 26A, such as an IP address, to update server 24 in a location update. Upon receiving each location update, update server 24 stores as association between the peer identity for peer 26A and the one of peers 26B-26D that issued the location update. Instead of awaiting a location request 18 from peer 26A, query server 22 proactively estimates location information for the peer 26A device. Query server 22 may query location data store 42 with the peer identity for peer 26A to obtain peer identities for peer identities for peers 26B-26D, which query server 22 may then use to obtain location information for peers 26B-26D. Based on the location information obtained, query server 22 estimates location information for peer 26A and pushes the location information to location module 27 in location response 19.

Figure 3:
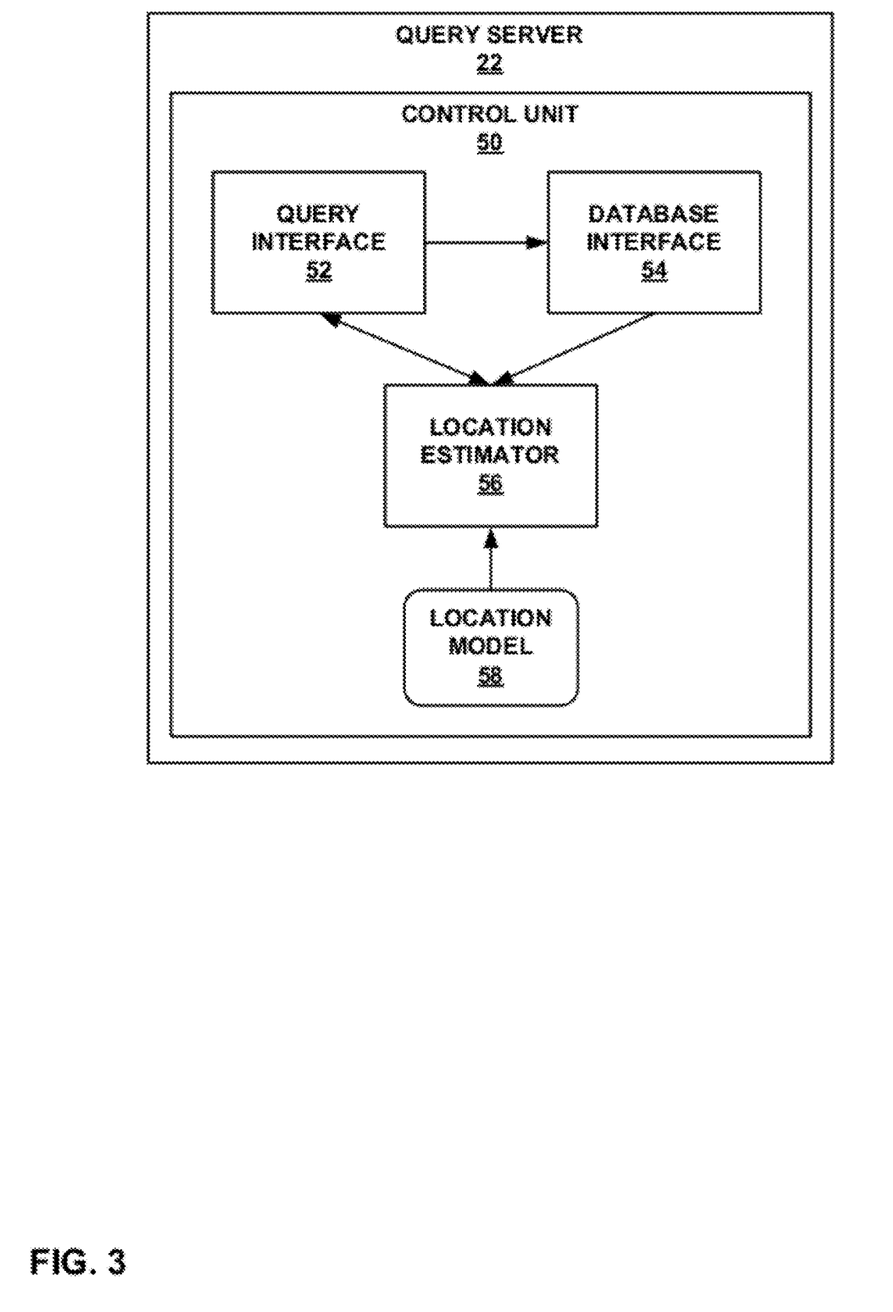
FIG. 3 is a block diagram illustrating a server that estimates a location for a device using one or more peer identities provided by the device.

FIG. 3 is a block diagram illustrating query server 22 of FIG. 2 in further detail, according to one example. Query server 22 comprises control unit 50, which may include one or more processors or controllers (not shown in FIG. 3) that execute software instructions, such as those used to define a software or computer program, stored to a non-transitory computer-readable medium (again, not shown in FIG. 3), such as a storage device (e.g., a disk drive, or an optical drive), or memory (such as Flash memory, random access memory or RAM) or any other type of volatile or non-volatile memory, that stores instructions to cause a programmable processor to perform the techniques described herein. Alternatively, or in addition, control unit 50 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing or other examples of dedicated hardware.

Query interface 52 is a wireless device-facing interface that receives location queries that each includes a set of one or more peer identities and passes respective sets of peer identities to database interface 54 for determination of location information for the peer identities. In some embodiments, query interface 52 may expose Simple Object Access Protocol (SOAP) methods, Remote Procedure Calls (RPCs), or a Common Object Request Broker Architecture (CORBA) interface. Query interface 52 may accept location queries, such as location query 18, that conform to a peer-to-peer location service protocol that prescribes location queries that include an application-layer message header that describes the message as a location query and further include an application-layer message body that carries a set of one or more peer identities.

Database interface 54 is a location data store-facing interface that receives sets of peer identities from query interface 52 and issues a location lookup query that includes the peer identities to the location data store. The location lookup query may comprise, for instance, a SQL query, an RPC, or a CORBA or SOAP method. Database interface 54 receives, responsive to the location lookup query, associated location information for the peer identities and passes the associated location information to location estimator 56.

Location estimator 56 calculates, based on a set of location information for an associated set of peer identities, an estimated location for a peer that participates in a wireless network with a set of peers corresponding to the set of peer identities. For example, with respect to FIG. 2, location estimator 56 may determine, based on a set of location information for an associated set of peer identities for peers 26B-26D, an estimated location for peer 26A.

In the illustrated example, location estimator 56 applies location model 58 to sets of location information to estimate, together with a confidence level, location information for a requesting peer of the set of peers. Location information may comprise a location in three-dimensional space. A confidence level may, in some cases, comprise a floating-point value in the range (0, 1]. Location estimator 56 may also calculate a covering radius for the set of peers corresponding to the location information. A covering radius represents the smallest value, r, such that a sphere (or, in two dimensional space, a circle) of radius r encompasses each of the set of peers. Location model 58 may include data structures, algorithms, and accumulated learning. Location model 58 may represent a mathematical model created by a modeler, such as an administrator or software agent. For example, location model 58 may specify calculating a mean location for a set of GPS coordinates that constitute the set of location information for the peers.

In some embodiments, a set of location information for an associated set of peer identities include location acquisition method identifiers. Location estimator 56 may use the location acquisition method identifiers to estimate a location and/or calculate the confidence level for estimated location information for a requesting peer. For example, a high-resolution location acquisition method, such as GPS, may entail a relatively high confidence level in contrast to a location acquisition method that is low-resolution. Location estimator 56 may include a mapping data structure (not shown) that maps location acquisition method identifiers to resolution values for calculating a confidence value.

In some instances, location estimator 56 uses a cellular base station identifier or wireless access point identifier received in a location query to fine tune an estimated location for a requesting device. Database interface 54 queries the location for the corresponding identifier from the location data store and passes the location to location estimator 56. Location estimator 56 may then use the location to increase/decrease a computed confidence level, modify an estimated location. Location estimator 56 may input the location to location model 58 to affect the estimated location.

Location estimator 56 provides the estimated location for a requesting peer device to query interface 52, which responds to the location query from the requesting peer device with a location response that includes the estimated location and may further include a calculated confidence level and/or a calculated covering radius for peers of the requesting peer device.

Query interface 52, database interface 54, and location estimator 56 may maintain state (not shown in FIG. 3) within query server 22 for a number of location queries. Such state may include location query records that each include a location query identifier, a peer identity and/or network address for the requesting peer device, peer identities for the sets of peers received in the location query from the requesting peer device, location information for the corresponding peers, and/or estimated location information for the requesting peer device, for example.

Figure 4:
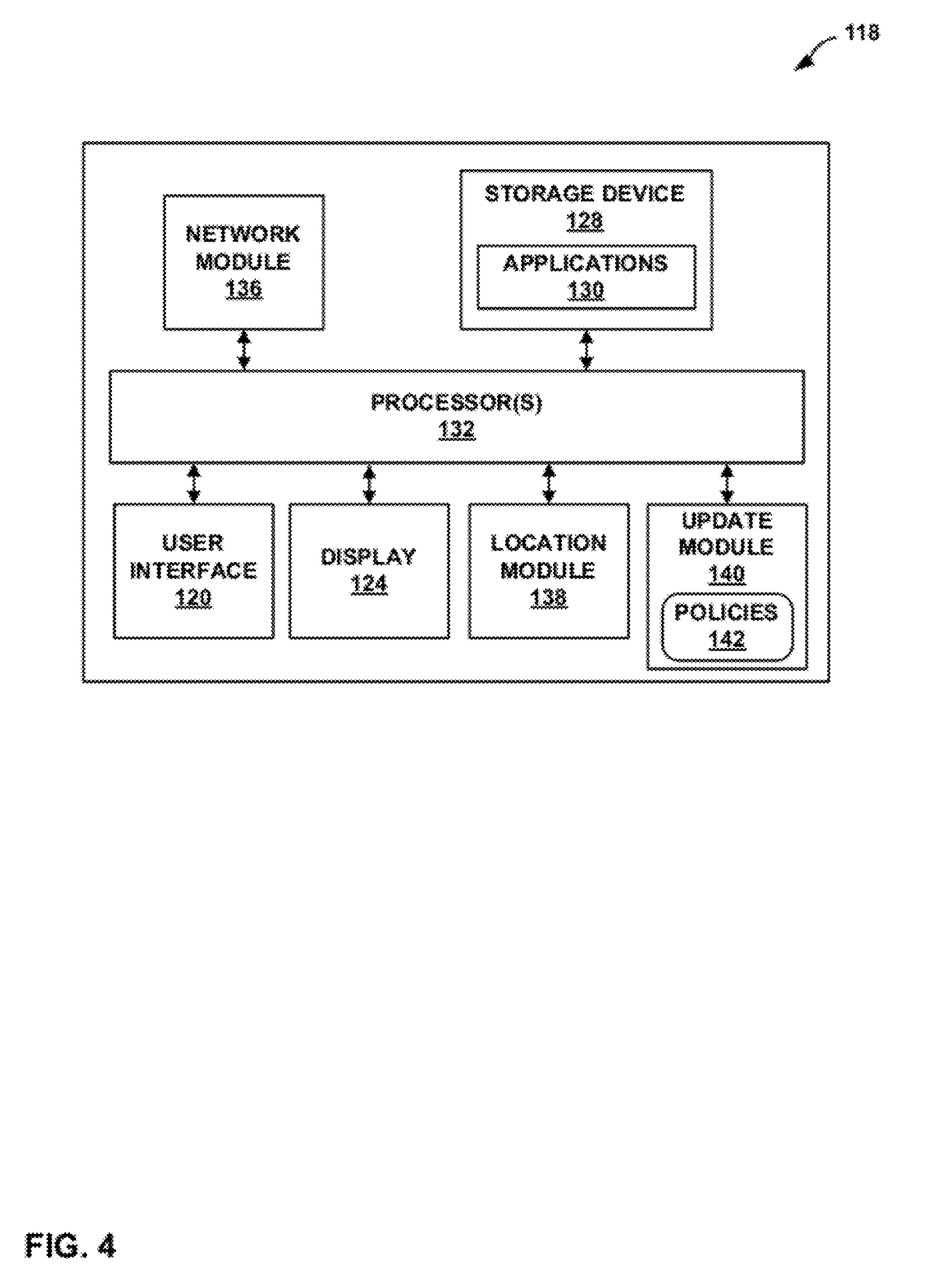
FIG. 4 is a block diagram illustrating an example wireless device that cooperates with a computing cloud to implement a peer-to-peer location service and, further, uses the peer-to-peer location service to obtain an estimated location for the wireless device.

FIG. 4 is a block diagram illustrating an example wireless device 118, which may represent one of wireless devices 26A-26D of FIG. 2. In the illustrated embodiment, wireless device 118 includes user interface 120, display 124, storage device 128, one or more processors 132, network module 136, location module 138, and update module 140. Other example implementations of wireless device 118 are possible, having more or fewer components than those shown in FIG. 4. For example, wireless device 118 may be a personal computer having additional components (e.g., an optical drive, a camera, etc.). In another example, wireless device 118 may be a personal media player having fewer components than those shown in FIG. 4 (e.g., a personal media player that lacks a display).

User interface 120 allows a user of wireless device 118 to interact with wireless device 118. Examples of user interface 120 include an embedded keypad or other buttons. User interface 120 may also include a detachable or otherwise independent device, such as a traditional remote control device having a keypad, a keyboard, a mouse, a roller ball, buttons, or other devices that allow a user to interact with wireless device 118. A user may use user interface 120 to control media content being presented by wireless device 118 (e.g., audio or video content). In an example, a user may use user interface 120 to navigate to a web page on the Internet using an Internet browser application in applications 130 in order to display the content hosted by the web page. User interface 120 may present textboxes, graphical selection interfaces, or other interfaces with which a user may enter location information, such as a street address, zip code, city/state, building floor or room number.

Display 124 may comprise a variety of display devices such as a liquid crystal display (LCD), an e-ink display, a cathode ray tube (CRT), a plasma display, an organic light emitting diode (OLED) display, or another type of display device. Display 124 presents applications 130 content to a user of wireless device 118 and may further present user interface 120 in the form of a graphical user interface (GUI).

Storage device 128 stores instructions for applications 130 that may be executed by one or more processors 132 of wireless device 118. For ease of description, applications 130 that may be executed by multiple processors 132 are described below as being executed by one processor 132. Applications 130 may be pre-installed by a manufacturer of wireless device 118, or may be downloaded by a user from a server via a network, or installed using a portable storage medium (e.g., a Flash drive). Applications 130 may be executed by processor 132 in response to a user interacting with wireless device 118 via user interface 120 to execute the applications 130.

Storage device 128 may also include instructions that cause processor 132 to perform functionality of location module 138 and update module 140. Storage device 128 may store policies 142 of update module 140. Storage device 128 may comprise a computer-readable, machine-readable, or processor-readable storage medium that comprises instructions that cause one or more processors, e.g., processor 132, to perform various functions. Storage device 128 may include any non-transitory computer-readable storage media, such as random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media.

Processor 132 may include any one or more of a microprocessor, a controller, a digital signal processor (DSP), an application specific integrated circuit (ASIC), a field-programmable gate array (FPGA), or equivalent discrete or integrated logic circuitry. Additionally, the functions attributed to processor 132, in this disclosure, may be embodied as software, firmware, hardware or any combination thereof.

Processor 132 may execute one or more of applications 130 either alone or concurrently. Examples of applications 130 include an application for displaying television content provided by a satellite or cable provider, an application for displaying content hosted on the World Wide Web, a web browser application, a social networking application, an e-mail application, programs to retrieve stock quotes, programs to search for restaurants or other businesses, programs that retrieve current and future weather information, games, a program to search the Internet, a program that provides news, and program that provides maps. Applications 130 may be executed based on a request from a user, and may be terminated based on a request from a user. Some applications 130 may be running continuously in the background. Some applications 130 may be executed automatically by wireless device 118 such as at power up and may be terminated automatically by wireless device 118 such as at power down.

In some examples, any application of applications 130 executed by processor 132 may require location information that describes a location of wireless device 118. For example, an application to locate nearby restaurants may require such location information in order to identity restaurants that are nearby, where "nearby" refers to a distance from wireless device 118 in two- or three-dimensional space.

Location module 138 represents an example embodiment of location module 27 of FIG. 2 and uses the peer-to-peer location service in the manner described above. That is, location module 138 issues peer discovery requests to obtain a list of peer identities, sends the list to the peer-to-peer location service in a location request, and receives the requested location information in a location response from, for instance, a computing cloud or query server. Location module 138 provides the location information to any requesting application in applications 130 to improve location-targeted network and application services. For example, the nearby restaurant application described above may send the location information to a corresponding server for the restaurant application to enable the server to identity nearby restaurants and thereafter send any identified restaurants to wireless device 118 for presentation to a user.

Update module 140 and policies 142 represent example embodiments of update module 38 and policies 30, respectively. Update module 140 cooperates with the peer-to-peer location service to provide, in accordance with policies 142, location updates that include location information for wireless device 118. Location information may be determined using a GPS receiver or other location determination module (in some embodiments of wireless device 118) to receive or calculate location coordinates, velocity vectors, cellular base station identities, and WAP identities, for example, or by prompting a user to enter a location into an interface of user interface 120.

Figure 5:
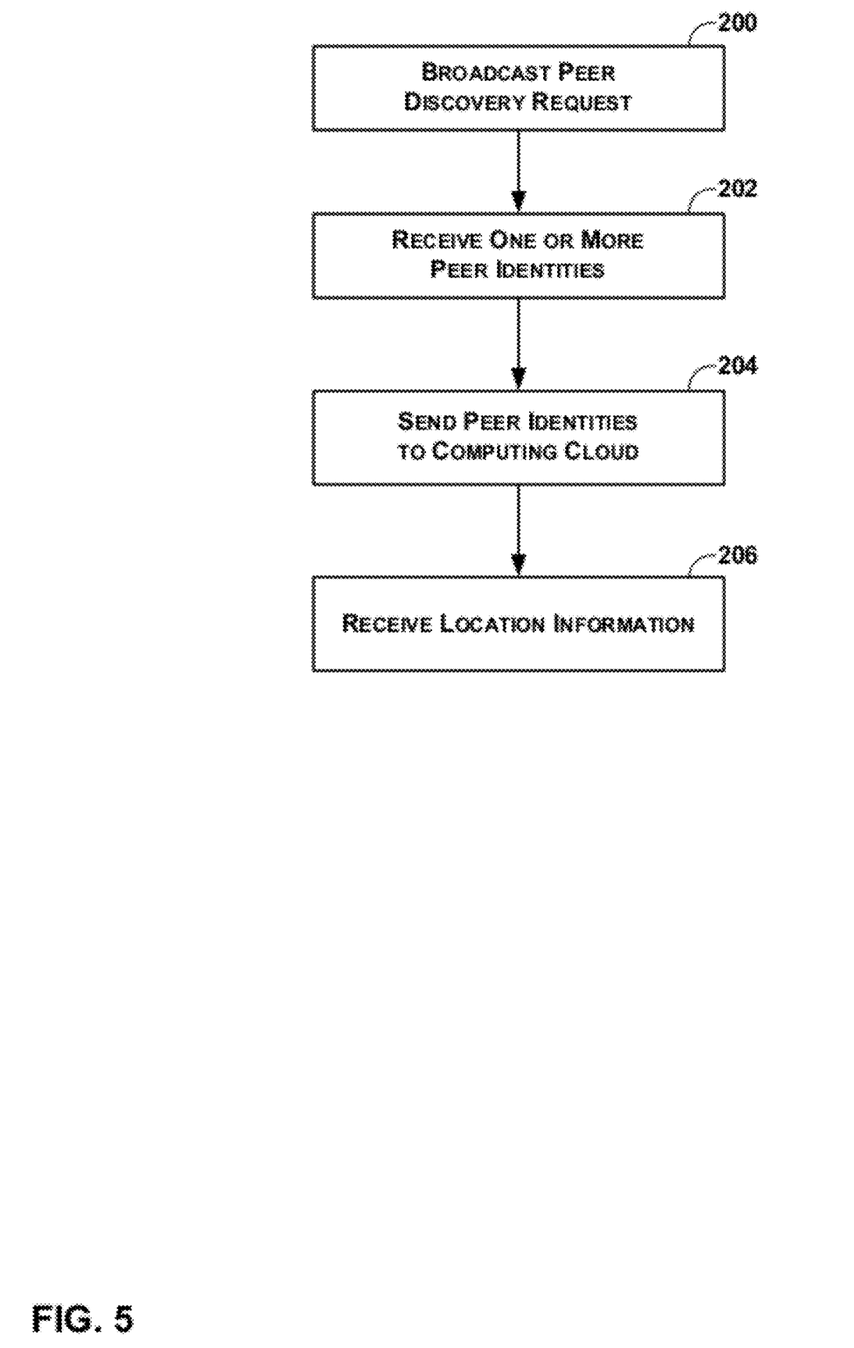
FIG. 5 is a flow chart illustrating an example mode of operation for a wireless device that requests and receives an estimated location from a peer-to-peer location service.

FIG. 5 is a flow chart illustrating an example mode of operation for peer 26A of FIG. 2. Location module 27 broadcasts peer discovery request 38 to attempt to identify peer devices proximate to peer 26A in wireless network 34 (200). Location module 27 receives, from one or more peer devices 26, one or more peer responses 40 that each includes a peer identity for the corresponding peer device (202). Location module 27 assembles the received peer identities into location request 18 and issues the location request to a computing cloud or, in the example embodiment of FIG. 2, to query server 22 (204). In response to location request 18, location module 27 receives location response 19 that includes an estimate location for peer 26A (206).

Figure 6:
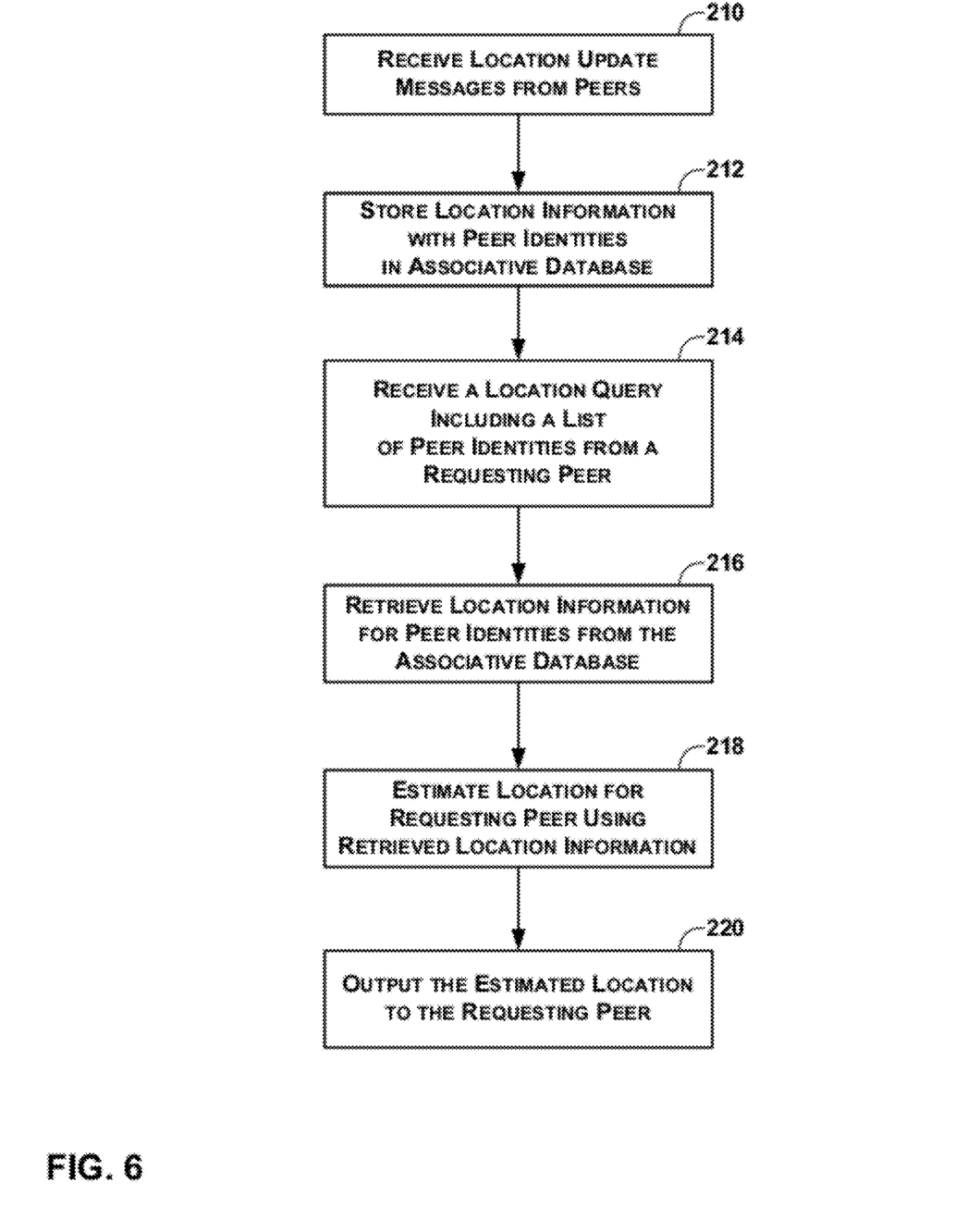
FIG. 6 is a flow chart illustrating an example mode of operation for example devices that implementation a location service to estimate a location for a requesting wireless device.

FIG. 6 is a flow chart illustrating an example mode of operation for query server 22 and update server 24 to estimate a location for a requesting peer device. In operation, update server 24 receives one or more location update messages from corresponding peers (210). Each location update message include a peer identity and location information for the sending peer, which update server 24 associates with one another and stores in location data store 42 (212).

Query interface 52 of query server 22 receives, from a requesting peer, a location query that includes a list of one or more peer identities for one or more corresponding peer devices (214). Database interface 54 of query server 22 queries location data store 42 using the peer identities to retrieve associated location information for the peer identities (216).

Location estimator 56 applies location model 58 to the associated location information for the peer identities to estimate a location for the requesting peer (218), and query interface 52 returns the estimated location to the requesting peer (220).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a non-transitory computer-readable medium or computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals or carrier waves, although the term "computer-readable media" may include transient media such as signals, in addition to physical storage media.

Various embodiments of the disclosure have been described. These and other embodiments are within the scope of the following claims.

The invention claimed is:

1. A method comprising:
broadcasting a peer discovery request from a wireless communication device to a wireless communication network, wherein the peer discovery request comprises a request for one or more peer identities;
receiving, with the wireless communication device in response to the peer discovery request, one or more peer responses from corresponding one or more peer devices communicatively coupled to the wireless communication network, wherein the one or more peer responses each include a respective peer identity of the one or more peer identities and do not include a respective physical location for a responding one of the corresponding one or more peer devices;
sending a location query that includes the one or more peer identities from the wireless communication device to a server of a location service, wherein the location query comprises a request for a physical location of the wireless communication device that is estimated by the location service based at least on the physical locations of the one or more peer devices; and
receiving, with the wireless communication device in a location response from the location service, the estimated physical location of the wireless communication device.

2. The method of claim 1, wherein the wireless communication network comprises an infrastructure network that comprises a base station, the method further comprising:
sending the peer discovery request from the wireless communication device to the base station, wherein the peer discovery request comprises a request for the one or more peer identities, and
wherein receiving the one or more peer identities for the corresponding one or more peer devices comprises receiving one or more peer responses that each comprise a respective peer identity from the base station.

3. The method of claim 1, wherein receiving the one or more peer identities comprises monitoring wireless network traffic traversing the wireless communication network and determining the one or more peer identities from the wireless network traffic.

4. The method of claim 1, further comprising:
determining, with the wireless communication device, a physical location of the wireless communication device; and
sending a location update message from the wireless communication device to the server of the location service, wherein the location update message includes the physical location and a peer identity of the wireless communication device.

5. The method of claim 4, wherein the physical location is selected from a group consisting of Global Positioning System (GPS) coordinates, a cellular base station identifier, a wireless access point identifier, Global System for Mobile communications (GSM) localization information, and time difference of arrival (TDOA) information.

6. The method of claim 1, wherein each of the one or more peer identities is a privacy-preserved peer identity, wherein a privacy-preserved peer identity prevents identification of the corresponding one or more peer devices.

7. The method of claim 1, wherein the wireless communication network comprises an ad-hoc wireless communication network.

8. The method of claim 1, wherein the wireless communication device is a mobile wireless communication device.

9. A method comprising:
receiving, with a server of a location service, location update messages from corresponding wireless communication devices, wherein the location update messages include physical locations and peer identities for the corresponding wireless communication devices, wherein each of the physical locations for the corresponding wireless communication devices comprises Global Positioning System coordinates;
storing, with the server, the physical locations and the peer identities to a storage device that provides data storage and retrieval for the location service;

receiving, with the server, a location query from a first wireless communication device that is a peer of the wireless communication devices, wherein the location query includes the peer identities;

querying, with the server, the storage device using the peer identities to obtain physical locations of the wireless communication devices corresponding to the peer identities;

determining, with the server, an estimated physical location of the first wireless communication device that is a peer of the wireless communication devices based at least on the physical locations; and outputting the estimated physical location from the server to the first wireless communication device in a location response.

10. The method of claim 9, wherein determining the estimated physical location of the first wireless communication device based at least on the physical locations comprises applying, with the server, a location model to the physical locations for the wireless communication devices.

11. The method of claim 10, wherein the location update messages include location acquisition method identifiers that specify location acquisition methods for corresponding physical locations, and the method further comprising:

applying, with the server, the location model to the location acquisition method identifiers to calculate a confidence level for the estimated physical location; and outputting the confidence level from the server to the first wireless communication device.

12. The method of claim 9, wherein the location query further comprises a base station identifier for a base station that serves the first wireless communication device, and wherein determining the estimated physical location of the first wireless communication device further comprises determining the estimated physical location based at least on a physical location of the base station.

13. The method of claim 9, calculating, with the server, a confidence level for the estimated physical location based at least on the physical locations of the wireless communication devices; and outputting the confidence level from the server to the first wireless communication device.

14. The method of claim 9, wherein the server comprises a server of a cloud computing network that operates the location service.

15. A wireless communication device coupled to a wireless communication network, the wireless communication device comprising:

a location module that broadcasts a peer discovery request to the wireless communication network, wherein the peer discovery request comprises a request for one or more peer identities, wherein the location module receives, in response to the peer discovery request, one or more peer peer responses from corresponding one or more peer devices communicatively coupled to the wireless communication network, wherein the one or more peer responses each include a respective peer identity of the one or more peer identities and do not include a respective physical location for a responding one of the corresponding one or more peer devices of the peer devices, wherein the location module sends a location query that includes the peer identities to a location service, wherein the location query comprises a request for a physical location of the wireless communication device that is estimated by the location service based at least on the physical locations of the one or more peer devices, and wherein the location module receives, in a location response from the location service, the estimated physical location.

16. A system comprising:

an update server that receives location update messages from corresponding wireless communication devices, wherein the location update messages include physical locations and peer identities for the corresponding wireless communication devices, wherein each of the physical locations for the corresponding wireless communication devices comprises Global Positioning System coordinates;

a location data store comprising a computer readable storage medium that stores the physical locations and identifiers to a storage device that provides data storage and retrieval;

a query interface of a query server that receives a location query from a first wireless communication device that is a peer of the wireless communication devices, wherein the location query includes the peer identities;

a database interface of a query server that queries the location data store using the peer identities to obtain the physical locations;

a location estimator that determines an estimated physical location of the first wireless communication device based at least on the physical locations, wherein the query interface of the query server outputs the estimated physical location to the first wireless communication device in a location response.

17. A tangible computer-readable medium comprising instructions for causing a programmable processor to:

broadcast a peer discovery request from a wireless communication device to a wireless communication network, wherein the peer discovery request comprises a request for one or more peer identities;

receive, with the wireless communication device in response to the peer discovery request, one or more peer responses from corresponding one or more peer devices communicatively coupled to the wireless communication network;

send a location query that includes the one or more peer identities from the wireless communication device to a location service, wherein the location query comprises a request for a physical location of the wireless communication device that is estimated by the location service based at least on the physical locations of the one or more peer devices; and receive, with the wireless communication device in a location response from the location service, the estimated physical location of the wireless communication device.

18. A tangible computer-readable medium comprising instructions for causing a programmable processor to:

receive, with a server of a location service, location update messages from corresponding wireless communication devices, wherein the location update messages include physical locations and peer identities for the corresponding wireless communication devices, wherein each of the physical locations for the corresponding wireless communication devices comprises Global Positioning System coordinates;

store, with the server, the physical locations and the peer identities to a storage device that provides data storage and retrieval for the location service;

receive, with the server, a location query from a first wireless communication device that is a peer of the wireless communication devices, wherein the location query includes the peer identities;

query, with the server, the storage device using the peer identities to obtain physical locations of the wireless communication devices corresponding to the peer identities;

determine, with the server, an estimated physical location of the first wireless communication device that is a peer of the wireless communication devices based at least on the physical locations; and output the estimated physical location from the server to the first wireless communication device in a location response.

* * * * *